Aug. 29, 1950 J. J. PALOTSEE Re. 23,264

WASHING MACHINE HAVING ROTARY BASKET AND IMPELLER

Original Filed March 17, 1947 4 Sheets-Sheet 1

Inventor
John J. Palotsee

By

Attorneys

WASHING MACHINE HAVING ROTARY BASKET AND IMPELLER

Original Filed March 17, 1947 4 Sheets-Sheet 2

WASHING MACHINE HAVING ROTARY BASKET AND IMPELLER

Original Filed March 17, 1947 4 Sheets-Sheet 3

Inventor
John J. Palotsee
By
Attorneys

WASHING MACHINE HAVING ROTARY BASKET AND IMPELLER

Original Filed March 17, 1947 4 Sheets-Sheet 4

Inventor
John J. Palotsee
By Alexander Powell
Attorneys

Reissued Aug. 29, 1950

Re. 23,264

UNITED STATES PATENT OFFICE 23,264

WASHING MACHINE HAVING ROTARY BASKET AND IMPELLER

John J. Palotsee, Youngstown, Ohio

Original No. 2,437,968, dated March 16, 1948, Serial No. 735,185, March 17, 1947. Application for reissue March 15, 1949, Serial No. 81,581

20 Claims. (Cl. 68—148)

Matter enclosed in heavy brackets [ ] appears in the original patent but forms no part of this reissue specification; matter printed in italics indicates the additions made by reissue This invention is a novel power-driven cleaning or washing machine adapted to be used for cleaning greasy automobile and other machine parts, kitchen utensils, dishes, clothes, or rags or other articles, and the principal object thereof is to provide a washer embodying certain novel features of construction, hereinafter set forth.

I will explain the invention with reference to the accompanying drawings, which illustrate one practical embodiment thereof, to enable others familiar with the art to adopt and use the same; and will summarize in the claims, the novel features of construction, and novel combinations of parts, for which protection is desired.

Figure 1:
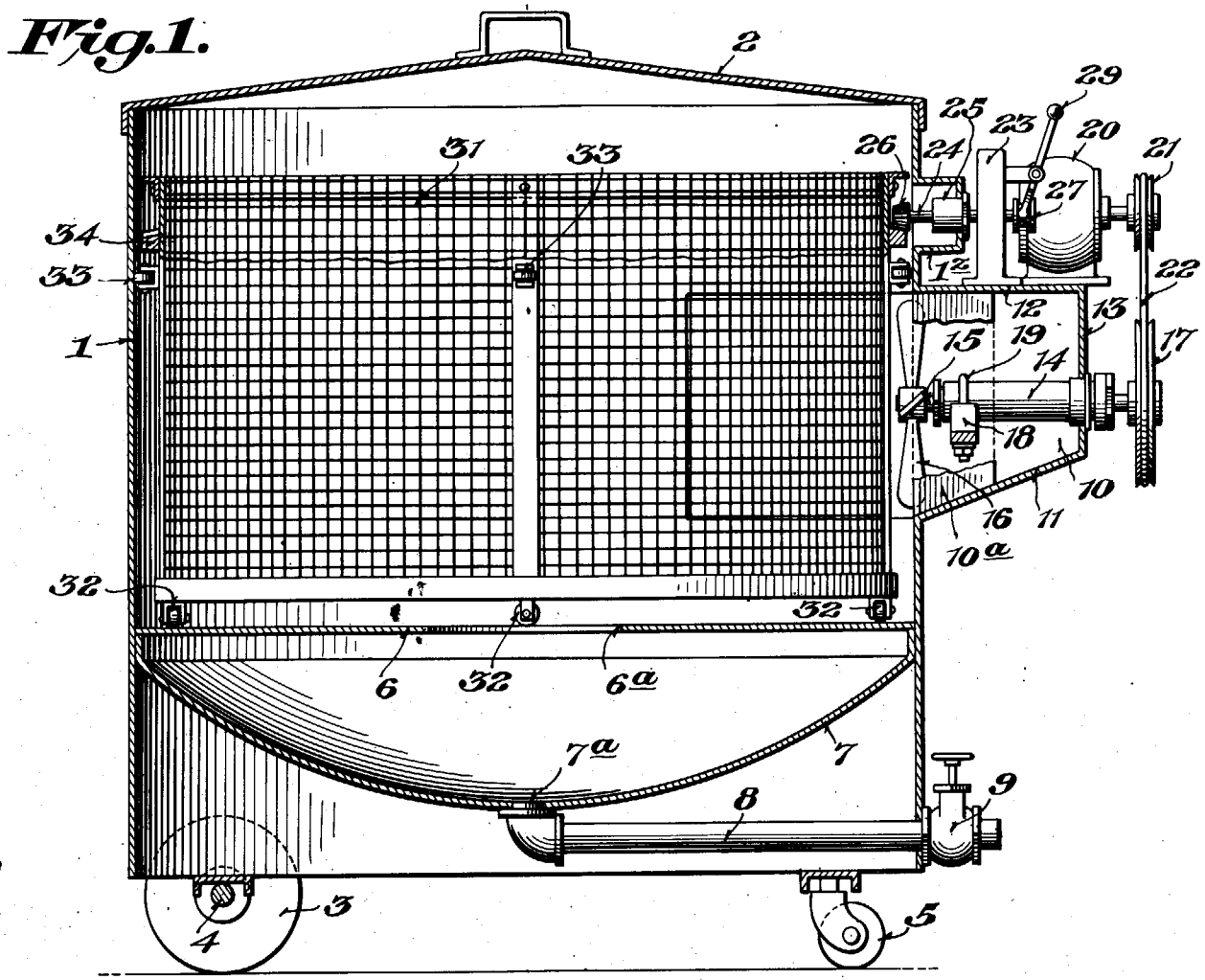
Figure 1 is a vertical section through my novel cleaning or washing machine.

As shown, my cleaning and washing machine preferably comprises a casing 1, preferably cylindrical in shape, open at the top and having a removable cover 2. Casing 1 may be open at the bottom, and is supported on wheels 3 carried by axle 4 secured to the lower end of the casing adjacent one end, and is also supported on swivel casters 5 adjacent the other end of the casing, whereby the machine may be readily moved from place to place. Disposed somewhat above the open bottom of the casing 1 is a false bottom plate 6 having a relatively large central opening 6a, as shown more particularly in Figs. 1 and 2. Below the false bottom 6 is a concave bottom plate 7 having an outlet 7a at its center connected by a radially disposed pipe 8 passing through the casing 1 and provided with a drainage valve 9 disposed [exteriorally] exteriorly of the casing 1.

Figure 2:
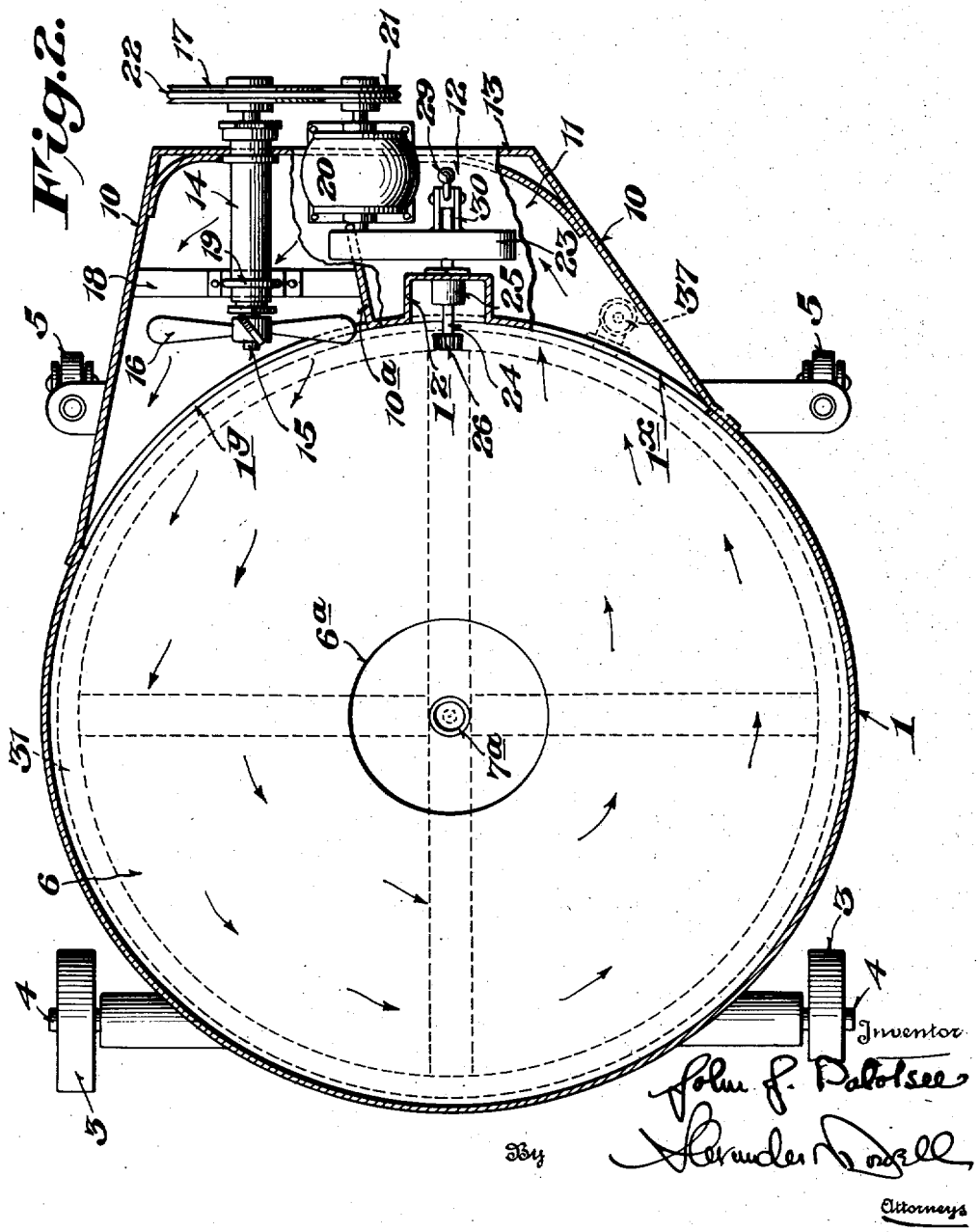
Fig. 2 is a horizontal section through the cleaner.

As shown more particularly in Fig. 2, at one side of the casing 1 is a hollow protuberance bounded by side plates 10 which are preferably disposed at an outwardly converging angle to each other, a bottom plate 11 sloping upwardly and outwardly, and a horizontal top plate 12, the outer end of said protuberance being closed by an outer plate 13, said protuberance being welded or otherwise secured to the side of casing 1.

The casing 1 communicates with one side of the interior of the protuberance through an opening 1x in the side of casing 1, as shown in Fig. 2, and communicates with the opposite side of the protuberance through an opening 1y, for the purpose hereinafter set forth.

Within the protuberance, opposite the opening 1y, is a bearing sleeve 14 for a shaft 15 carrying a fluid impeller 16, said bearing extending through the outer wall 13 of the protuberance and carrying a sprocket or pulley 17 on its outer end of relatively large size. Preferably the inner end of bearing sleeve 14 is secured to a strut 18 by means of a clamp 19 of any desired type.

Upon the top 12 of the protuberance is an electric or other motor or prime mover 20 carrying on its shaft a sprocket or pulley 21 disposed in the plane of sprocket or pulley 17, a chain or belt or the like 22 running around the sprockets or pulleys 21 and 17 whereby the impeller shaft 15 will be rotated by and with the prime mover 20.

Figure 6:
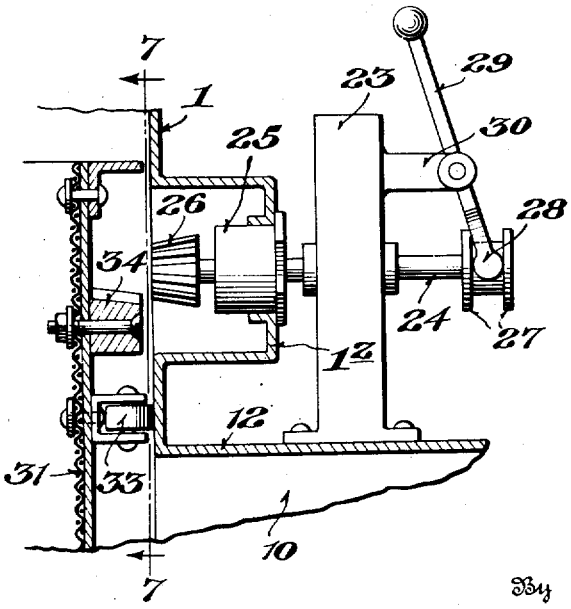
Fig. 6 is an enlarged detail section through the basket rotating means, showing the drive clutch.
Figure 7:
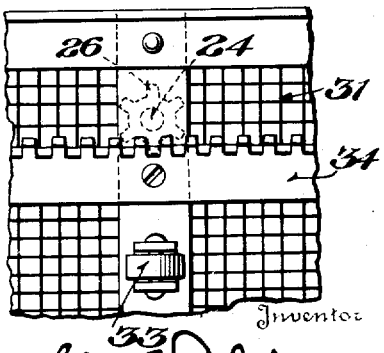
Fig. 7 is a section on the line 7—7, Figure 6.

Also mounted upon the top 12 of the protuberance is a gear box 23 containing a speed-reducing mechanism connected with the shaft of prime mover 20 and with an axially slidable driven shaft 24, which is journaled in the mechanism 23 and in a bearing 25 mounted in a lateral offset portion 1z of casing 1, said shaft 24 carrying on its inner end a beveled pinion 26, as shown in Figs. 1, 2 and 6. Shaft 24 carries on its outer end spaced yoke engaging collars 27 receiving the yoke 28 of a shifting lever 29, as shown in Fig. 6, whereby the shaft 24 may be shifted axially of the bearing 25 and mechanism 23, said lever 29 being pivoted on a bracket 30 carried by the mechanism 23. By the above construction the gear 26 may be shifted in and out of the offset portion 1z of the casing 1 while being driven directly from the prime mover 20.

Figure 4:
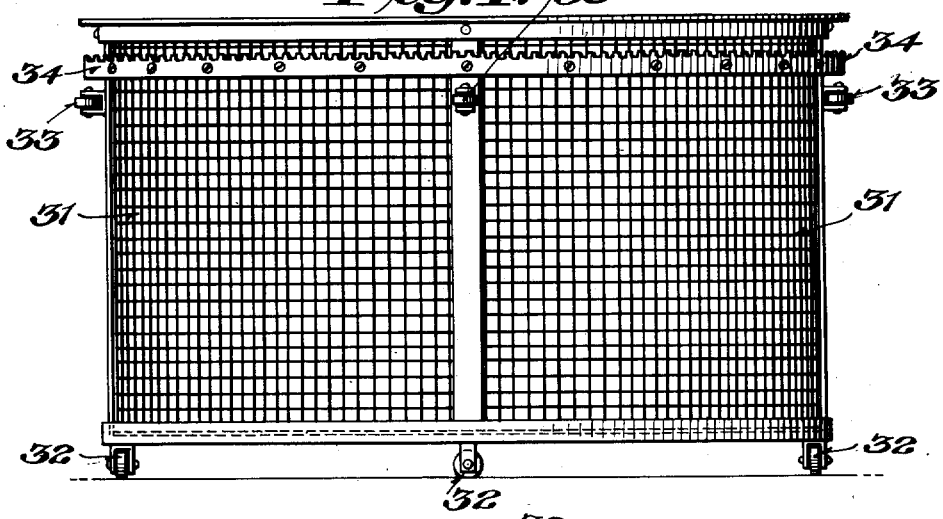
Fig. 4 is an enlarged elevation of the rotary wire basket, detached.
Figure 5:
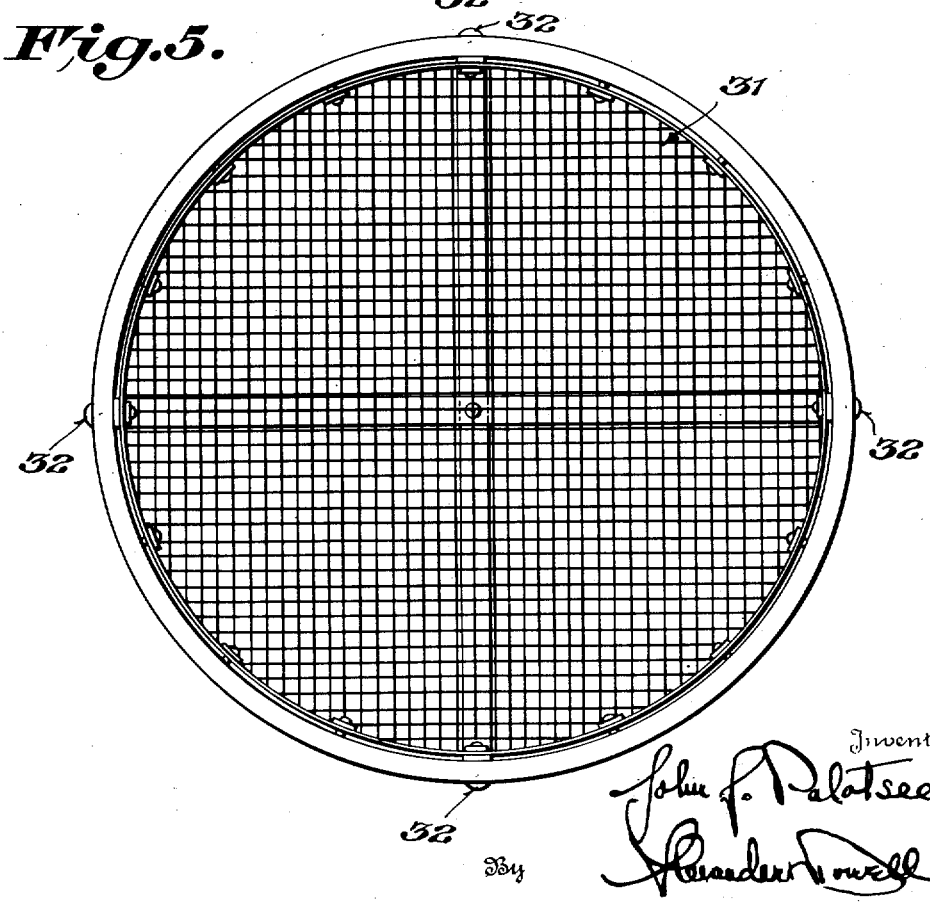
Fig. 5 is a top plan view of said basket.

Within the casing 1 is a basket 31, shown in Figs. 1, 4, and 5, the same being cylindrical in shape, open at its top and closed at its bottom, the same preferably consisting of a wire mesh mounted upon a cylindrical open framework of any desired combination. At the bottom of the basket 31 are casters 32 whereby the same may be readily rotated when resting upon the false bottom 6 of casing 1. At the sides of the basket 31 adjacent the upper end thereof are other casters 33 adapted to engage the inner side walls of the casing 1 to maintain same in spaced relation thereto. Extending around the basket 31, adjacent its upper end is a ring gear 34 having beveled teeth on its upper face adapted to mesh with the teeth of the bevel pinion 26 when shaft 24 is shifted into the position shown in Figs. 1 and 2, the pinion 26 being disengaged from the ring gear 34 when shaft 24 is shifted into the position shown in Fig. 6.

By the above construction, when prime mover 20 is activated the wire mesh basket 31 will be rotated thereby, and the impeller 16 will be also rotated thereby. When the pinion 26 is retracted within the offset portion 1z of casing 1 as shown in Fig. 6, the basket 31 as a unit may be removed from the top of casing 1, upon removal of cover 2, without interference with the said pinion 26.

In operation

Figure 3:
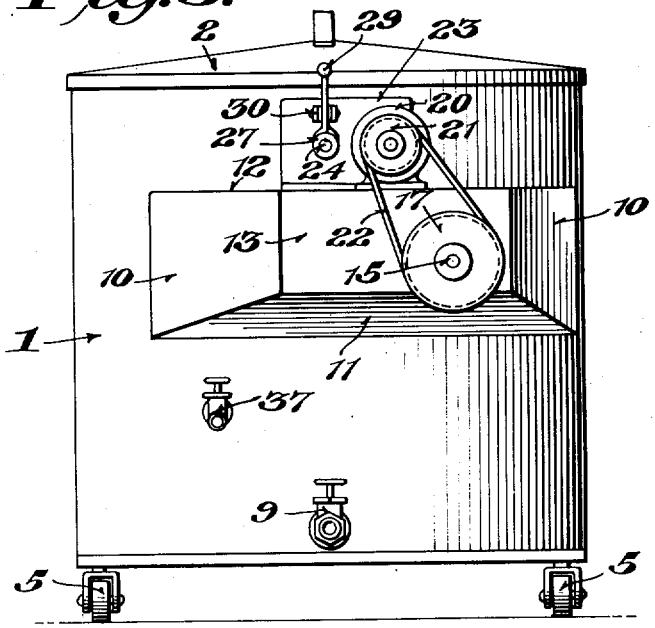
Fig. 3 is an end view of the cleaner.

The casing 1 holds the cleaning fluid, while the articles to be cleaned are placed in the wire basket 31 which is placed in the casing. When the prime mover 20 is started the impeller 16 will cause the cleaning fluid within casing 1 to rotate within the casing in a counterclockwise direction while at the same time the wire basket will be caused to rotate or revolve in the counter or clockwise direction. Any sediment on the articles being cleaned, set free during such operation, will drop to the false bottom 6 of the casing and will pass inwardly due to the turbulence of the swirling fluid towards the center of plate 6 same passing through the central hole 6a in false bottom 6 and entering the lower compartment below said plate, thus keeping the cleaning fluid above the false bottom 6 relatively free from sediment. The fluid in the lower compartment remains relatively motionless and the sediment may be drawn off through the valved pipe 8 used for draining the machine. However, the upper compartment above false bottom 6 may be drained without draining the entire cleaner, by manipulation of the valve 37 (Figs. 2 and 3), which is disposed slightly above the top of the false bottom 6 of the casing 1.

The cleaning fluid may be heated while in the machine by placing a gas burner, electric or other heating unit underneath the casing 1.

By mounting the ring gear 34 and pinion 26 between the basket 31 and wall of casing 1, and below the upper angle iron of the basket frame, a safe arrangement is provided since all gearing are enclosed. Also, when the pinion 26 is engaged with the ring gear 34, the same is disposed above the ring gear, thus eliminating any possibility of the pinion 26 and ring gear 24 becoming unmeshed, as might be the case if the basket 31 should rise within the casing 1; also the pinion 26 will hold the wire basket 31 down on the false bottom of the casing 1.

I do not limit my invention to the exact form shown in the drawings, for obviously changes may be made therein within the scope of the claims.

I claim:

1. In a cleaning or washing machine, a cylindrical casing for fluid open at its top and having a bottom; a removable cover for said top; a false bottom within the casing disposed above the casing bottom and having a relatively large central opening therein; said bottom having a valved outlet therein; a rotatable open cylindrical basket within the casing seating upon the false bottom; a hollow lateral protuberance on the side of the casing above the false bottom having its sides communicating with the casing through relatively large openings therethrough; an impeller journaled within the protuberance adjacent one side thereof adapted to set up a swirling motion of the fluid above the false bottom; a motor; means actuated by the motor for rotating the impeller to swirl the fluid in one direction; and means actuated by the motor for rotating the basket in the opposite direction.

2. In a machine as set forth in claim 1, casters on the bottom of the basket engaging the false bottom; and other casters on the sides of the basket engaging the inner wall of the casing above the said openings.

3. In a machine as set forth in claim 1, said impeller [driving] *rotating* means comprising speed reducing means connecting the shafts of the motor and impeller; said basket rotating means comprising a speed reducing mechanism driven by the motor and having an axially slidable driven shaft; a bevel pinion on the inner end of the driven shaft adapted when the driven shaft is shifted to move in and out of the *principal space in said* casing, manual means for shifting the driven shaft, and a ring gear around the basket below the pinion having bevel teeth on its upper face adapted to mesh with the bevel pinion when the latter is shifted into the casing, the pinion being disengaged from the ring gear when the pinion is retracted out of the casing to permit withdrawal of the basket through the open top of the casing.

4. In a machine as set forth in claim 3, the wall of the casing having an *outwardly* offset portion therein [in way of the driven shaft] for receiving the bevel pinion when retracted out of the *principal space in said* casing.

5. In a machine as set forth in claim 3, the impeller shaft, driven shaft and motor shaft being disposed in parallel relation; said speed reducing means being directly driven and said shaft shifting means comprising a lever pivoted on the speed reducing mechanism and having a yoke engaging the driven shaft.

6. A cleaning or washing machine, comprising a cylindrical casing for fluid open at its top and bottom; a removable cover for said top; a false bottom within the casing disposed above the open bottom thereof and having a relatively large central circular opening therein; a concave bottom plate below the false bottom having *a valved* [an] outlet at its low point; [said concave plate having a valved outlet therein;] a drain valve in the side of the casing above the false bottom; a rotatable open cylindrical basket within the casing seating upon the false bottom; a hollow lateral protuberance on the side of the casing above the false bottom having its sides communicating through a pair of relatively large openings with the interior of the casing; an impeller journaled within the protuberance adjacent one side thereof adapted to set up a swirling motion of the fluid above the false bottom; a motor; means actuated by the motor for rotating the impeller to swirl the fluid in one direction; and means actuated by the motor for rotating the basket in the opposite direction.

7. In a machine as set forth in claim 6, the sides of the protuberance converging outwardly; the bottom of the protuberance sloping upwardly and outwardly; and the top of the protuberance being disposed substantially horizontally.

8. In a machine as set forth in claim 6, casters on the bottom of the basket engaging the false bottom; and other casters on the sides of the basket engaging the inner wall of the casing above the level of said openings into the protuberance.

9. In a machine as set forth in claim 6, said motor being mounted on the protuberance and driving said impeller shaft through speed reducing means; said basket rotating means comprising a speed reducing mechanism mounted on the protuberance driven by the motor and having an axially slidable driven shaft mounted therein; a bevel pinion on the inner end of the driven shaft adapted when the driven shaft is shifted to move into and out of the casing, manual means for shifting the driven shaft, and a ring gear around the basket below the pinion having bevel teeth on its upper face adapted to mesh with the bevel pinion when the latter is shifted into the casing, the pinion being disengaged from the ring gear when the pinion is retracted out of the casing to permit withdrawal of the basket through the open top of the casing.

10. In a machine as set forth in claim 9 the wall of the casing having an offset portion therein in way of the driven shaft for receiving the bevel pinion when retracted out of the casing.

11. In a machine as set forth in claim 9, the impeller shaft, driven shaft and motor shaft being disposed in parallel relation; said speed reducing means comprising belt and pulley drive connecting the motor shaft and impeller shaft; the motor shaft directly driving the speed reducing mechanism of the driven shaft; and said shaft shifting means comprising a lever pivoted on the speed reducing mechanism having a yoke engaging the driven shaft.

12. A cleaning or washing machine comprising a cylindrical casing for fluid open at its top and bottom; a removable cover for said top; a false bottom within the casing disposed above the open bottom thereof and having a relatively large central circular opening therein; a concave bottom plate below the false bottom having an outlet at its low point; a pipe extending from the outlet through the side of the casing; a valve in said pipe; a drain valve in the side of the casing above the false bottom; a rotatable open mesh cylindrical basket within the casing having an open top and seating upon the false bottom; a hollow lateral protuberance on the side of the casing above the false bottom having its sides communicating through a pair of relatively large openings with the interior of the casing; an impeller mounted on a horizontally disposed shaft journaled within the protuberance adjacent one side thereof adapted to set up a swirling motion of fluid above the false bottom; a motor, means actuated by the motor for rotating the impeller to swirl the fluid in one direction; and means actuated by the motor for rotating the basket in the opposite direction; the fluid below the false bottom remaining substantially motionless and receiving the sediment through the central opening in the false bottom which is withdrawn through the valved pipe.

13. In a machine as set forth in claim 12, the sides of the protuberance converging outwardly; the bottom of the protuberance sloping upwardly and outwardly; and the top of the protuberance being disposed substantially horizontally.

14. In a machine as set forth in claim 12, casters on the bottom of the basket adjacent the periphery thereof engaging the false bottom; and other casters on the sides of the basket engaging the inner wall of the casing above the level of said openings into the protuberance.

15. In a machine as set forth in claim 12, said motor being mounted on the protuberance and driving said impeller shaft through speed reducing means; said basket rotating means comprising a speed reducing mechanism mounted on the protuberance driving by the motor and having a horizontal driven shaft axially slidably mounted in the mechanism, a bevel pinion on the inner end of the driven shaft adapted when the driven shaft is shifted to move into and out of the casing, manual means for shifting the driven shaft, and a ring gear on the side of the basket below the pinion having bevel teeth on its upper face adapted to mesh with the bevel pinion when the latter is shifted into the casing, the pinion being disengaged from the ring gear when the pinion is retracted out of the casing to permit withdrawal of the basket through the open top of the casing.

16. In a machine as set forth in claim 15, the wall of the casing having an offset portion therein in way of the driven shaft for receiving the bevel pinion when retracted out of the casing.

17. In a machine as set forth in claim 15, the impeller shaft, driven shaft and motor shaft being disposed in parallel relation; said speed reducing means comprising a belt and pulley drive connecting the motor shaft and impeller shaft; the motor shaft directly driving the speed reducing mechanism of the driven shaft; and said shaft shifting means comprising a lever pivoted on the speed reducing mechanism having a yoke engaging the driven shaft.

*18. In a cleaning or washing machine, a cylindrical casing for liquid open at its top and having a side wall and a bottom, a rotatable cylindrical basket within said casing having a side wall of mesh-like material to permit the free flow of liquid therethrough, a hollow circumferentially elongated protuberance on the side wall of said casing having a side wall extending between widely spaced points of said casing and with the end portions of said last mentioned side wall generally tangent to adjacent portions of the side wall of said casing, an impeller journalled within the protuberance at one end thereof for rotation about a generally horizontal axis off-set from the principal vertical axis of said casing, said side wall of said casing being cut away within the confines of said protuberance and in front of said impeller to provide a large open passage through said side wall of said casing for the free passage into said casing of liquid propelled by said impeller, said side wall of said casing being also cut away within the confines of said protuberance at the other end thereof to provide a large passage through said side wall of said casing for the flow of liquid from said casing into said protuberance and into the space behind said impeller, said impeller being spaced inwardly from the outermost portion of the side wall of the protuberance whereby liquid is caused to circulate between said casing and said protuberance along a curved closed path including said passages in series, means to rotate said impeller, and means for rotating said basket.*

*19. A machine as set forth in claim 18 further characterized in that said means for rotating said basket comprises a ring gear carried by said basket, a drive shaft journaled in the outer wall of said casing and extending radially into said casing, a pinion gear on the inner end of said drive shaft and adapted to mesh with said ring gear, and means providing a quick detachable interconnection between said ring gear and pinion gear whereby said basket and ring gear may be lifted up out of said casing.*

*20. A cleaning or washing machine comprising in combination a vertically disposed cylindrical*

*liquid receiving casing having an open top, a false bottom wall in said casing having an opening therein to provide a sediment trap in the lower end portion of said casing, a hollow lateral protuberance on the side wall of said casing above said false bottom wall and having a side wall extending circumferentially between widely spaced points of said casing with the end portions of said last mentioned side wall generally tangent to adjacent portions of the side wall of said casing, a basket having an open mesh-like side wall received in said casing above said false bottom wall in lateral alignment with said protuberance, the side wall of said casing being cut away within the confines of said protuberance to provide circumferentially spaced inlet and outlet passages between the circumferential ends of said protuberance and the space within said casing, an impeller journaled in one circumferential end portion of said protuberance for rotation about a generally horizontal axis offset with respect to the principal vertical axis of said casing, means to rotate said impeller; and said impeller being of the axial flow type and being spaced inwardly from the outermost portion of the side wall of said protuberance whereby liquid is caused*

*to circulate around an orbital path including in sequence said inlet passage to said protuberance, the space in said protuberance behind said impeller, said outlet passage, and the space in said basket.*

JOHN J. PALOTSEE.

REFERENCES CITED

The following references are of record in the file of this patent or the original patent:

UNITED STATES PATENTS

| Number | Name | Date |
|---|---|---|
| 111,176 | Churchman | Jan. 24, 1871 |
| 1,083,380 | Tupper | Jan. 6, 1914 |
| 1,143,217 | McGrath | June 15, 1915 |
| 1,169,420 | Myrick | Jan. 25, 1916 |
| 1,378,925 | White | May 24, 1921 |
| 1,433,216 | McCutchen | Oct. 24, 1922 |
| 1,559,346 | Moore | Oct. 27, 1925 |
| 1,714,838 | Perkins | May 28, 1929 |
| 1,869,510 | Saunders | Aug. 2, 1932 |
| 1,964,520 | Krauss | June 26, 1934 |
| 2,304,014 | Paine | Dec. 1, 1942 |